US012315666B2

(12) United States Patent
Fukuoka et al.

(10) Patent No.: US 12,315,666 B2
(45) Date of Patent: May 27, 2025

(54) COIL COMPONENT

(71) Applicant: TDK CORPORATION, Tokyo (JP)

(72) Inventors: Ryo Fukuoka, Tokyo (JP); Hironori Kimata, Tokyo (JP); Masataro Saito, Tokyo (JP); Masazumi Arata, Tokyo (JP); Hitoshi Ohkubo, Tokyo (JP)

(73) Assignee: TDK CORPORATION, Tokyo (JP)

( * ) Notice: Subject to any disclaimer, the term of this patent is extended or adjusted under 35 U.S.C. 154(b) by 840 days.

(21) Appl. No.: 17/545,607

(22) Filed: Dec. 8, 2021

(65) Prior Publication Data

US 2022/0189679 A1 Jun. 16, 2022

(30) Foreign Application Priority Data

Dec. 11, 2020 (JP) ................................ 2020-205814

(51) Int. Cl.
*H01F 27/28* (2006.01)
*H01F 27/32* (2006.01)
*H01F 27/29* (2006.01)

(52) U.S. Cl.
CPC ....... *H01F 27/2804* (2013.01); *H01F 27/324* (2013.01); *H01F 27/29* (2013.01)

(58) Field of Classification Search
CPC .... H01F 27/2804; H01F 27/324; H01F 27/29; H01F 27/323; H01F 2017/048; H01F 17/0013; H01F 27/292; H01F 17/04; H01F 17/0006; H01F 17/02
USPC ........................................ 336/200, 232, 192
See application file for complete search history.

(56) References Cited

U.S. PATENT DOCUMENTS

| | | | | |
|---|---|---|---|---|
| 2016/0155556 | A1* | 6/2016 | Ohkubo | H01F 41/046 336/83 |
| 2016/0351316 | A1* | 12/2016 | Ohkubo | H01F 27/325 |
| 2017/0032884 | A1 | 2/2017 | Choi et al. | |
| 2019/0088402 | A1* | 3/2019 | Kim | H01F 17/0013 |
| 2019/0180913 | A1* | 6/2019 | Moon | H01F 27/2804 |
| 2019/0189332 | A1* | 6/2019 | Kim | H01F 17/04 |
| 2021/0125766 | A1 | 4/2021 | Choi et al. | |
| 2021/0151234 | A1* | 5/2021 | Ohkubo | H01F 27/2804 |

FOREIGN PATENT DOCUMENTS

| | | |
|---|---|---|
| JP | 2005-210010 A | 8/2005 |
| JP | 2017-017142 A | 1/2017 |
| JP | 2017-034227 A | 2/2017 |

* cited by examiner

*Primary Examiner* — Shawki S Ismail
*Assistant Examiner* — Kazi S Hossain
(74) *Attorney, Agent, or Firm* — Oliff PLC

(57) ABSTRACT

In the coil component, the maximum reference surface height of the entire wall of the outermost wall and the innermost wall is the same as the reference surface height of the winding part of the coil, that is, equal to or less than the reference surface height of the winding part of the coil. In addition, in both the outermost wall and the innermost wall, the reference surface height of the second side surface is lower than the reference surface height of the winding part of the coil. In this case, in the vicinity of the upper surface of the outermost wall and the innermost wall, the magnetic flux toward the main surface side of the substrate is suppressed from being blocked by the outermost wall and the innermost wall, and the magnetic flux circulation is improved. Thus, the coil characteristics of the coil component are improved.

8 Claims, 12 Drawing Sheets

COIL COMPONENT

CROSS-REFERENCE TO RELATED APPLICATIONS

This application is based upon and claims the benefit of priority from Japanese Patent Application No. 2020-205814, filed on 11 Dec. 2020, the entire contents of which are incorporated herein by reference.

TECHNICAL FIELD

The present disclosure relates to a coil component.

BACKGROUND

Coil components such as surface mount-type planar coil elements are conventionally used in various electrical products such as household devices and industrial devices. In particular, small portable devices have come to be required to obtain two or more voltages from a single power source to drive individual devices due to enhanced functions. Therefore, surface mount-type planar coil elements are used also as power sources to satisfy such a requirement.

Such a coil component is disclosed, for example, in Japanese Unexamined Patent Publication No. 2005-210010. The coil component disclosed in this document include a substrate, planar spiral air core coils provided on front and back surfaces of the substrate, and a through-hole conductor provided so as to pass through the substrate at magnetic cores of the air core coils to connect the air core coils to each other.

Such an air-core coil is formed by growing a conductive material, such as Cu, by, plating on a seed pattern provided on the substrate, but the space between adjacent turns of a winding part of the coil becomes narrow due to the plating growth in the planar direction of the substrate. When the space between adjacent turns of the winding part of the coil is narrow, there is a fear that the insulation of the coil is reduced. Therefore, there is demand for a technique to more reliably insulate the coil.

For example, Japanese Unexamined Patent Publication No. 2017-017142 discloses a technology for ensuring insulation between the winding part of the coil by a plurality of resin walls provided on a substrate.

SUMMARY

Since the above-described resin wall is non-magnetic, the resin wall may hinder the circulation of the magnetic flux of the coil. In this case, the coil characteristics may deteriorate. As a result of intensive studies, the inventors have newly found a technique improving coil characteristics by improving the magnetic flux circulation of the coil.

According to the present disclosure, a coil component having improved coil characteristics is provided.

A coil component according to an aspect of the present disclosure includes a substrate, a coil provided on a main surface of the substrate by plating and having a winding part with a uniform reference surface height with the main surface of the substrate as a reference surface, a resin body provided on a main surface of the substrate and having a plurality of resin walls, the winding part of the coil extends between the plurality of resin walls, a resin film integrally covering an upper surface of the coil and an upper surface of the resin body, and a coating resin made of magnetic powder-containing resin, the coating resin integrally covers the coil, the resin body, and the resin film provided on the main surface of the substrate. The plurality of resin walls arranged on the main surface of the substrate include an outermost wall located at an outermost position, an innermost wall located at an innermost position, and an inter-wire wall interposed between the winding parts of the coil. In at least one of the outermost wall and the innermost wall, the maximum reference surface height of the entire wall is equal to or less than the reference surface height of the winding part of the coil, and the reference surface height of a second side surface opposite to a first side surface in contact with the winding part of the coil is lower than the reference surface height of the winding part of the coil.

In the above-described coil component, in at least one of the outermost wall and the innermost wall, the maximum reference surface height of the entire wall is equal to or less than the reference surface height of the winding part of the coil, and the reference surface height of the second side surface is lower than the reference surface height of the winding part of the coil. In this case, the magnetic flux circulation of the coil in the vicinity of the upper surface of the resin wall is improved, and the coil characteristics of the coil component are improved.

In the coil component according to another aspect, in at least one of the outermost wall and the innermost wall, the reference surface height of the second side surface is lower than the reference surface height of the first side surface.

In the coil component according to the other aspect, an upper surface of at least one of the outermost wall and the innermost wall in which the reference surface height of the second side surface is lower than the reference surface height of the first side surface is inclined with respect to the main surface of the substrate.

In the coil component according to another aspect, in at least one of the outermost wall and the innermost wall, the reference surface height of the second side surface is the same as the reference surface height of the first side surface.

In the coil component according to the other aspect, the reference surface height of the inter-wire wall is the same as the reference surface height of the winding part of the coil, and the upper surface of the inter-wire wall and the upper surface of the winding part of the coil form a flat surface.

In the coil component according to another aspect, the resin film has a uniform thickness on the winding part of the coil and on the inter-wire wall, and the uniform thickness is thinner than the thickness of the inter-wire wall.

In a coil component according to another aspect, the thickness of the outermost wall is greater than the thickness of the inter-wire wall.

In the coil component according to another aspect, the thickness of the outermost wall is 3 to 6 times the thickness of the inter-wire wall.

DETAILED DESCRIPTION

Figure 1:
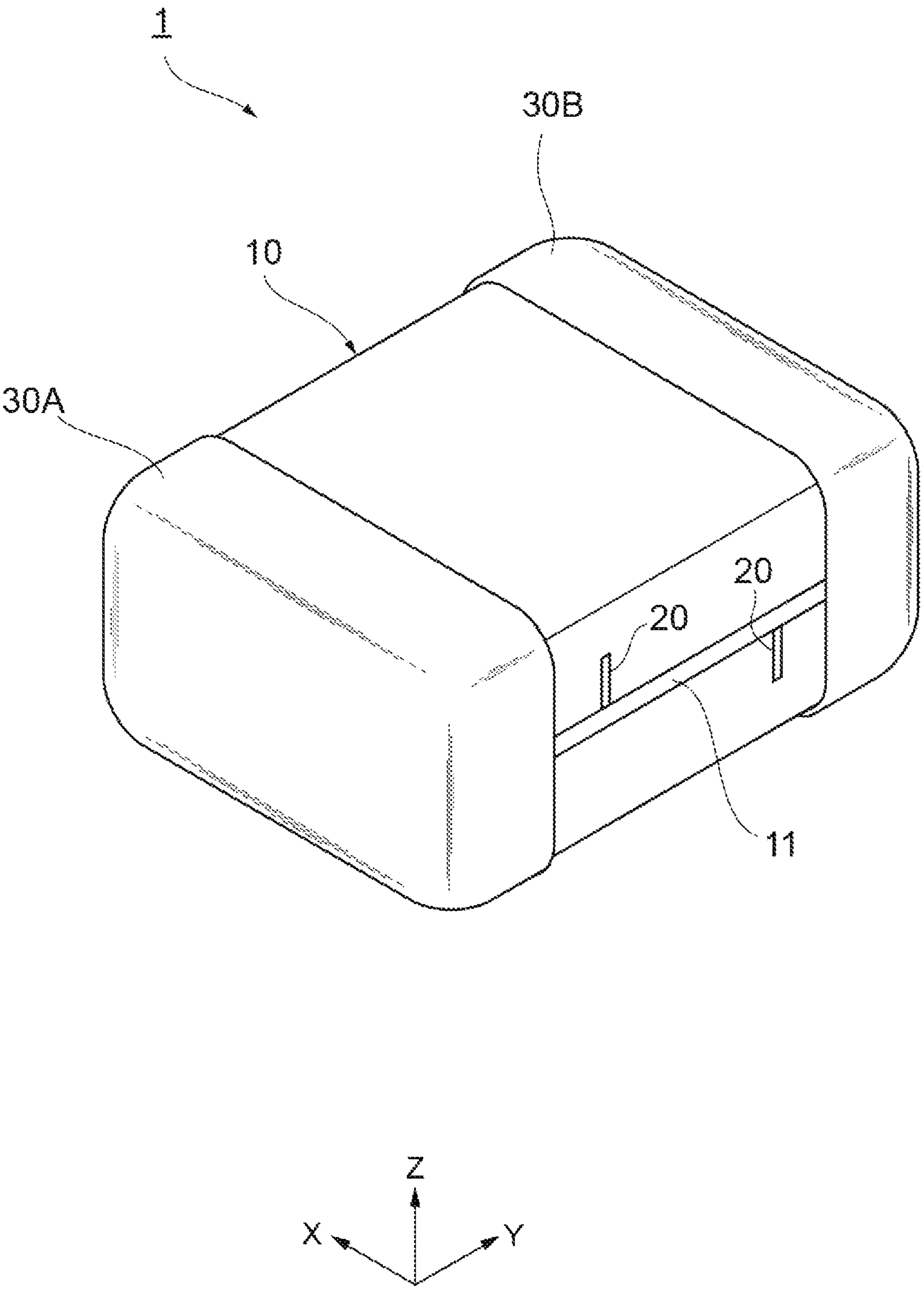
FIG. 1 is a schematic perspective view of a coil component according to an embodiment of the present disclosure.

Hereinbelow, an embodiment of the present disclosure will be described in detail with reference to the accompanying drawings. It is to be noted that in the following description, the same elements or elements having the same function are represented by the same reference numerals, and description thereof will not be repeated.

First, the structure of a coil component according to an embodiment of the present invention will be described with reference to FIGS. 1 to 4. For convenience of description, as shown in the drawings, X-, Y-, and Z-coordinates are set. More specifically, the thickness direction of the coil component is defined as a Z direction, a direction in which external terminal electrodes are opposed to each other is defined as a Y direction, and a direction orthogonal to the Z direction and the Y direction is defined as an X direction.

A coil component 1 includes a main body 10 having an approximate rectangular parallelepiped shape, and a pair of external terminal electrodes 30A and 30B provided to cover a pair of opposing end faces of the main body 10. The coil component 1 is designed to have, for example, a long side of 2.0 mm, a short side of 1.6 mm, and a height of 0.9 mm.

Hereinbelow, the production procedure of the main body 10 will be described while the structure of the coil component 1 will also be described.

Figure 2:
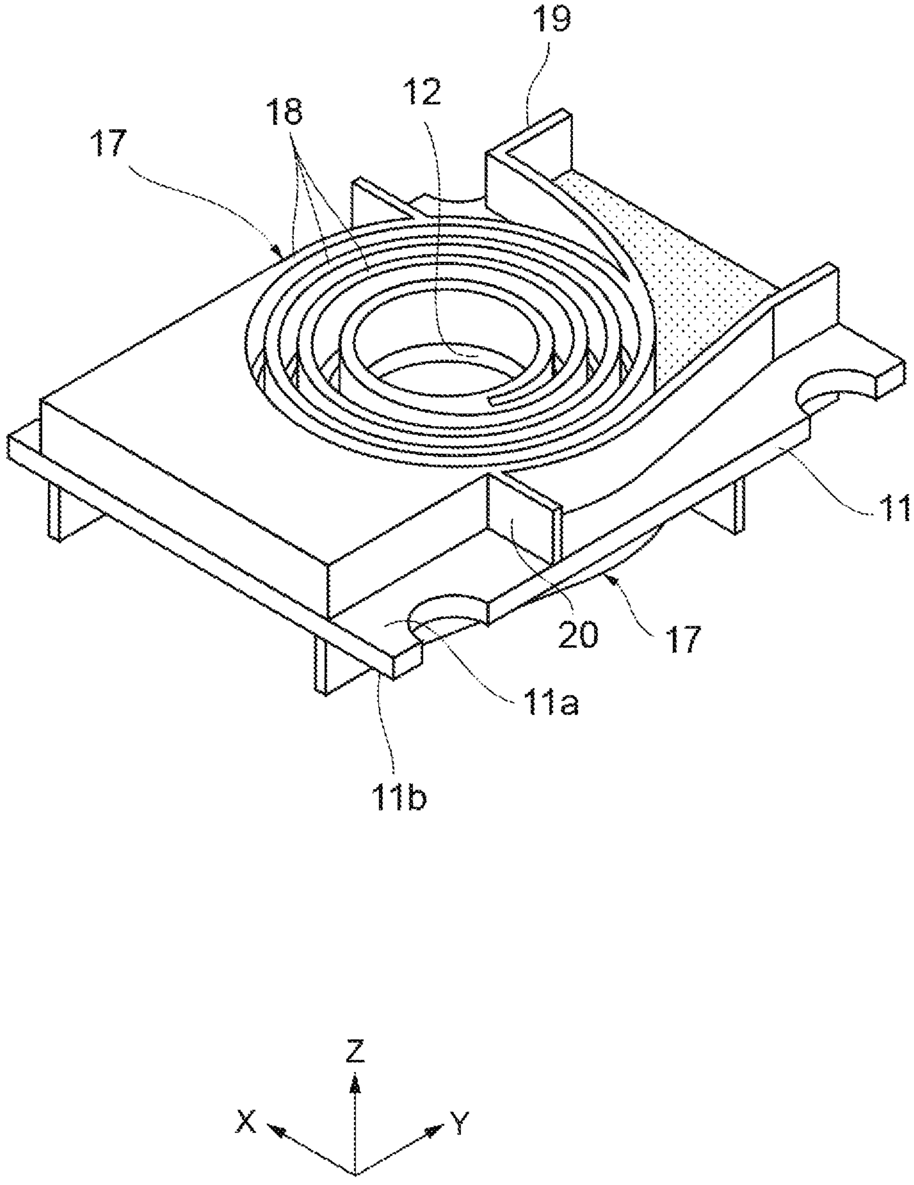
FIG. 2 is a perspective view of a substrate for use in manufacturing the coil component shown in FIG. 1.

The main body 10 includes a substrate 11 shown in FIG. 2. The substrate 11 is a plate-like rectangular member made of a non-magnetic insulating material. In the central part of the substrate 11, an approximately—circular opening 12 is provided to pass through the substrate 11 so that main surfaces 11*a* and 11*b* are connected to each other through the opening 12. As the substrate 11, a substrate can be used which is obtained by impregnating a glass cloth with a cyanate resin (BT (bismaleimide triazine) resin: trademark) and has a thickness of 60 μm. It is to be noted that polyimide, aramid, or the like may be used instead of BT resin. As a material of the substrate 11, ceramics or glass may also be used. The material of the substrate 11 may be mass-produced printed circuit board material or resin materials used for BT printed circuit boards, FR4 printed circuit boards, or FR5 printed circuit boards.

Figure 3:
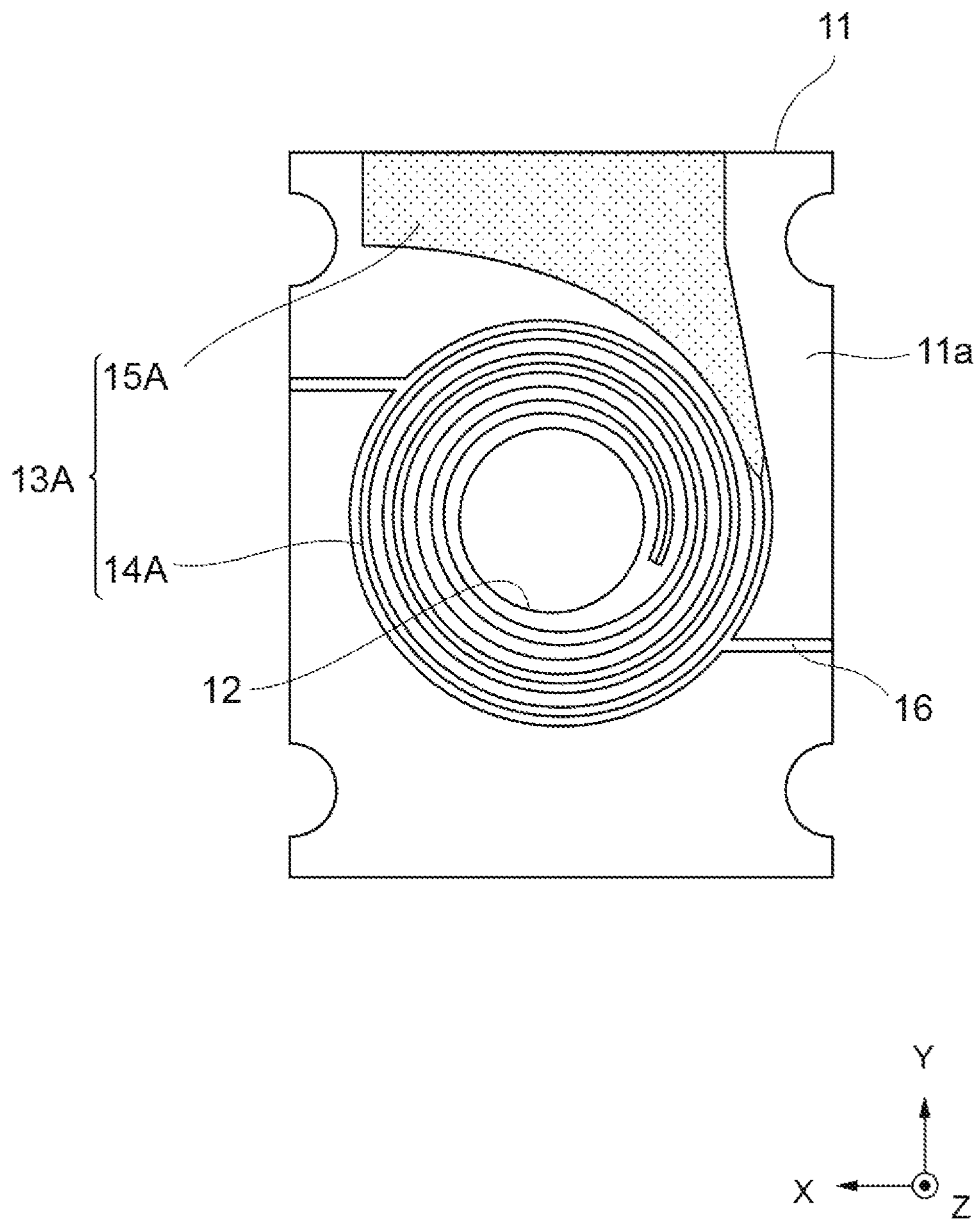
FIG. 3 is a plan view of a seed pattern on the substrate shown in FIG. 2.

On each of the main surfaces 11*a* and 11*b* of the substrate 11, as shown in FIG. 3, a seed pattern 13A is formed which allows a coil 13 that will be described later to be grown by plating. In the present embodiment, the seed pattern 13A is made of Cu. The seed pattern 13A has a spiral pattern 14A winding around the opening 12 of the substrate 11 and an end pattern 15A formed at the end thereof in the Y direction of the substrate 11. These patterns 14A and 15A are continuously and integrally formed. It is to be noted that the coil 13 provided on the one main surface 11*a* and the coil 13 provided on the other main surface 11*b* are opposite in electrode extraction direction, and therefore the end pattern 15A on the one main surface 11*a* and the end pattern on the other main surface 11*b* are formed at different ends in the Y direction of the substrate 11.

Returning to FIG. 2, a resin body 17 made of non-magnetic insulating material is provided on each of the main surfaces 11*a* and 11*b* of the substrate 11. The resin body 17 is a thick film resist patterned by known photolithography technique. The resin body 17 includes resin walls 18 defining growth a region of the winding part 14 of the coil 13 and resin walls 19 defining a growth region of an extraction electrode part 15 of the coil 13.

Figure 4:
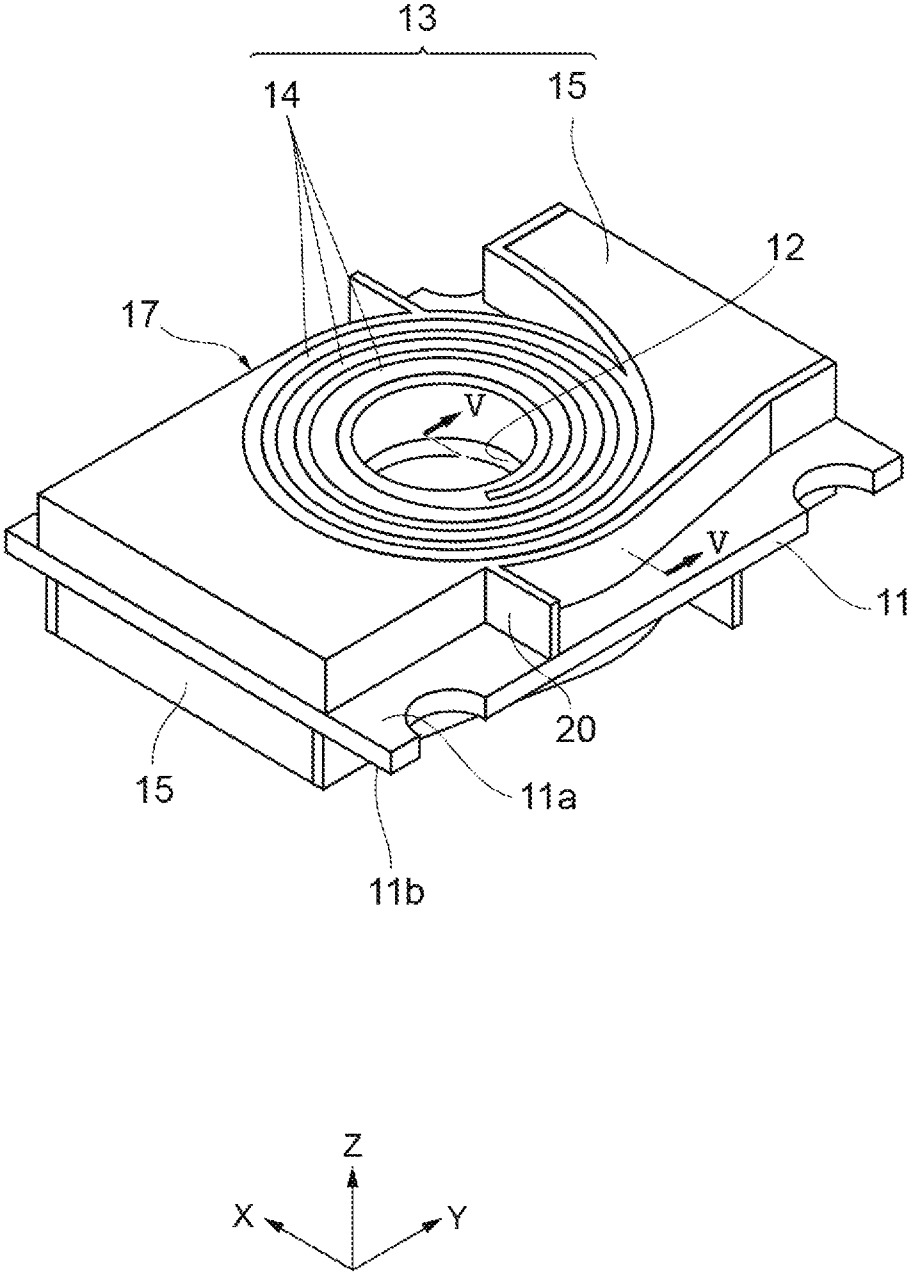
FIG. 4 is a perspective view illustrating one step of a method for manufacturing the coil component shown in FIG. 1.

FIG. 4 illustrates the state of the substrate 11 after the coil 13 is grown by plating using the seed pattern 13A. The plating growth of the coil 13 can be performed by a known plating growth method.

The coil 13 is made of copper, and has the winding part 14 formed on the spiral pattern 14A of the seed pattern 13A and the extraction electrode part 15 formed on the end pattern 15A of the seed pattern 13A. When viewed from above, like the seed pattern 13A, the coil 13 has the shape of a planar spiral air core coil that extends in parallel with the main surfaces 11*a* and 11*b* of the substrate 11. More specifically, the winding part 14 provided on the upper surface 11*a* of the substrate spirals outwardly in a counterclockwise direction when viewed from the upper surface side, and the winding part 14 provided on the lower surface 11*b* of the substrate spirals outwardly in a counterclockwise direction when viewed from the lower surface side. The ends of the both coils 13 on the substrate upper surface 11*a* and the lower surface 11*b* are connected to each other, for example, via a through hole provided near the opening 12. When an electrical current is passed in a single direction through the coils 13, the directions in which the electrical current passes through the both coils 13 are the same, and therefore magnetic fluxes generated by the both coils 13 are superimposed and enhance each other.

Figure 5:
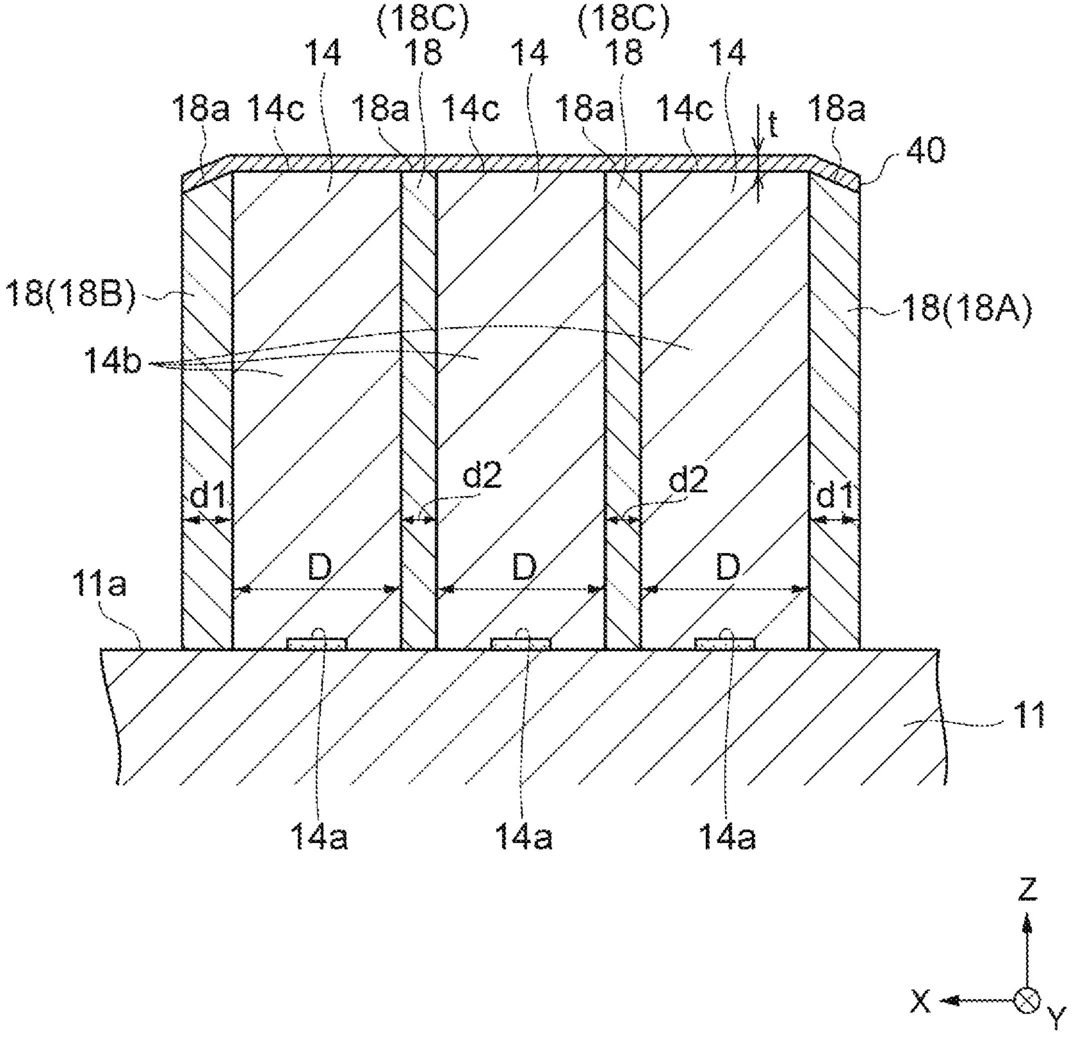
FIG. 5 is a sectional view taken along a line V-V in FIG. 4.

FIG. 5 is a cross-sectional view taken along line V-V of FIG. 4, showing a state of the substrate 11 after plating shown in FIG. 4.

As shown in FIG. 5, a plurality of resin walls 18 (four resin walls in FIG. 5) having a cross-sectional shape extending long along the normal direction (Z direction) of the substrate 11 are formed on the substrate 11. The plurality of resin walls 18 include an outermost wall 18A located outermost and an innermost wall 18B located innermost with respect to the coil axis or the opening 12, and inter-wire walls 18C sandwiched between adjacent the winding part 14 of the coil 13. The winding part 14 of the coil 13 grows along the Z direction between the resin walls 18. The winding part 14 of the coil 13 has a growing region defined in advance by resin walls 18 formed on the substrate 11 before plating.

The winding part 14 of the coil 13 is constituted of a seed part 14*a* being a part of the spiral pattern 14A and a plated part 14*b* plated and grown on the seed part 14*a*, and is formed by gradually growing the plated part 14*b* around the seed part 14*a*. At this time, the winding part 14 of the coil 13 grows so as to fill the space defined between two of the adjacent resin walls 18 and is formed in the same shape as the space defined between the resin walls 18. As a result, the winding part 14 of the coil 13 has a quadrilateral cross section (rectangular cross section in FIG. 5) extending long along the normal direction (Z direction) of the substrate 11.

That is, by adjusting the shape of the space defined between the resin walls 18, the shape of the winding part 14 of the coil 13 is adjusted, and the winding part 14 of the coil 13 can be formed in the shape as designed.

The winding part 14 of the coil 13 grows between the adjacent two resin walls 18 while coming into contact with the inner side surfaces of the resin walls 18 defining the growth region. At this time, neither mechanical bonding nor chemical bonding occurs between the winding part 14 of the coil 13 and the resin walls 18. That is, the winding part 14 of the coil 13 is grown by plating without bonding to the resin walls 18, and is therefore interposed between the resin walls 18 in a non-bonding state. In this specification, the term “non-bonding state” refers to a state in which neither mechanical bonding such as anchor effect nor chemical bonding such as covalent bonding has occurred.

The cross-sectional dimensions of the winding part 14 of the coil 13 are, for example, a height of 80 to 260 μm, a width (thickness) of 40 to 260 μm, and a ratio (aspect ratio) of the height to the width of the lower end portion (i.e. base) of 1 to 5. The aspect ratio of the winding part 14 of the coil 13 may be 2 to 5.

As shown in FIG. 5, both the upper surface 14*c* of the winding part 14 of the coil 13 and the upper surface 18*a* of the inter-wire wall 18C are flat surfaces parallel to the main surface 11*a* of the substrate 11. With the main surface 11*a* of the substrate 11 as a reference surface, the reference surface height H of the winding part 14 of the coil 13 is the same as the reference surface height H of the inter-wire wall 18C. Therefore, the upper surface 14*c* of the winding part 14 and the upper surface 18*a* of the inter-wire wall 18C constitute a flat surface.

Figure 6:
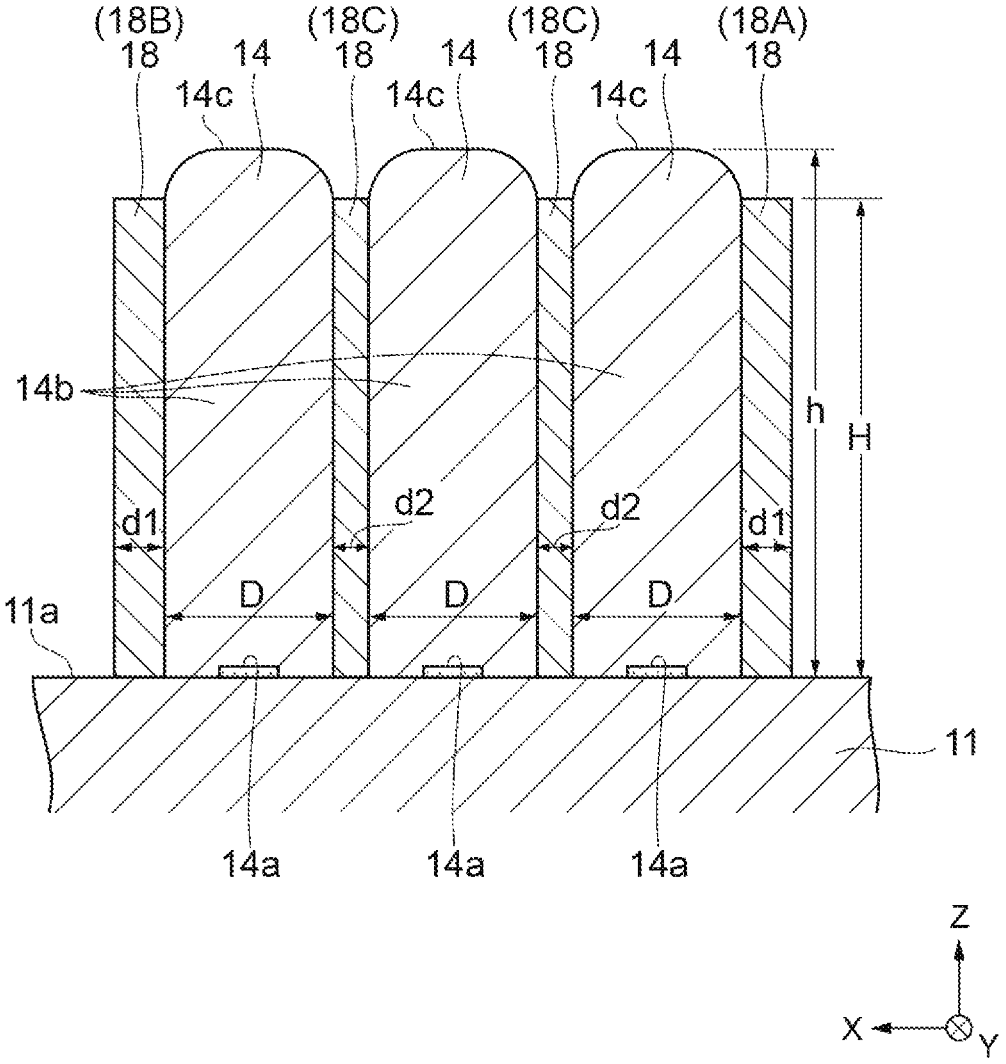
FIG. 6 is a perspective view illustrating one step of the method for manufacturing the coil component shown in FIG. 1.

In order to form a flat surface between the upper surface 18*a* of the resin wall 18 and the upper surface 14*c* of the winding part 14, for example, the winding part 14 is grown to a height h exceeding the reference surface height H of the inter-wire wall 18C as shown in FIG. 6. After the winding part 14 is grown to the height h, the upper surface 14*c* of the winding part 14 is polished by a known process, whereby the upper surface 14*c* of the winding part 14 and the upper surface 18*a* of the inter-wire wall 18C constitute a flat surface.

The thickness D of the winding part 14 of the coil 13 is uniform in the height direction. This is because the distance between the adjacent resin walls 18 is uniform in the height direction.

In the embodiment shown in FIG. 5, the thicknesses d1 and d2 of the resin walls 18 are also uniform in the height direction, similarly to the winding part 14 of the coil 13. As a result, the distance between the adjacent winding parts 14 of the coil 13 becomes uniform in the height direction. That is, the winding part 14 of the coil 13 has a structure in which a portion locally thinned in the height direction (that is, a portion where the breakdown voltage resistance is locally lowered) does not exist or hardly exists. The cross-sectional dimensions of the resin wall 18 are, for example, a height of 50 to 300 μm, a width (thickness) of 5 to 30 μm, and a ratio (aspect ratio) of the height to the width of the lower end portion (i.e. base) of 5 to 30. The cross-sectional dimensions of the resin wall 18 may be a height of 180 to 300 μm, a width (thickness) of 5 to 12 μm, and an aspect ratio of 15 to 30.

In addition, since the upper end of the space defined by the resin walls 18 is open and the upper end portion of the resin wall 18 does not wrap around so as to cover the upper side of the winding part 14, the design flexibility of the upper side of the winding part 14 is high.

As shown in FIG. 5, in the present embodiment, an insulating film 40 (resin film) is provided on the winding part 14 of the coil 13 and the resin wall 18 in order to enhance insulation between the winding part 14 and the metal magnetic powder contained in the coating resin 21 described later. The insulating film 40 can be made of an insulating resin. In this embodiment, the insulating film 40 is made of epoxy resin. The insulating film 40 is in direct or indirect contact with the upper surface 14*c* of the winding part 14 and integrally covers the winding part 14 and the resin wall 18. The insulating film 40 may selectively cover only the winding part 14. In addition, a predetermined bonding layer (for example, a blackened layer of copper plating by oxidation) may be provided in order to increase the bonding property between the winding part 14 and the insulating film 40.

As described above, since the upper surface 14*c* of the winding part 14 and the upper surface 18*a* of the inter-wire wall 18C are flush with each other, the insulating film 40 formed so as to cover them has a uniform thickness. The insulating film 40 is 0.5 to 15 μm (for example, 1 μm) thick, and is designed to be thinner than the thickness d2 of the inter-wire wall 18C. By reducing the thickness t of the insulating film 40, it is possible to increase the volume (i.e. magnetic volume) of the coating resin 21 while maintaining the element size, thereby improving the coil characteristics.

As shown in FIG. 5, in the present embodiment, the thicknesses d1 of the outermost walls 18A are larger than the thicknesses d2 of the inter-wire walls 18C (d1>d2). The thicknesses d1 of the outermost walls 18A are designed to be 2 to 6 times (for example, 4 times) the thicknesses d2 of the inter-wire walls 18C. Therefore, rigidity is imparted to the coil component 1 with respect to the pressure in the Z direction that is applied when the coil component 1 is manufactured or used. By making the outermost wall 18A relatively thick, this portion can mainly receive the pressure. From the viewpoint of rigidity, not only the thicknesses d1 of the outermost wall 18A but also the thicknesses d1 of the innermost wall 18B are thicker than the thicknesses d2 of the inter-wire walls 18C (d1>d2). Both the thicknesses d1 of the outermost wall 18A and the innermost wall 18B may be thicker than the thicknesses d2 of the inter-wire walls 18C, or one of the thicknesses d1 may be thicker than the thicknesses d2 of the inter-wire walls 18C. The thicknesses of the outermost wall 18A and the innermost wall 18B may be the same or different.

The above-described plating growth of the coil 13 is performed on both main surfaces 11*a* and 11*b* of the substrate 11. The ends of the coils 13 on both main surfaces it 11*a* and 11*b* are connected to each other via a through conductor (not shown) provided at the edge of the opening 12 of the substrate 11, and are electrically connected to each other.

In the present embodiment, the upper surface 18*a* of each of the outermost wall 18A and the innermost wall 18B of the plurality of resin walls 18 is inclined with respect to the main surface 11*a* of the substrate 11. More specifically, the upper surface 18*a* of each of the outermost wall 18A and the innermost wall 18B is inclined so as to gradually descend as the distance from the winding part 14 of the coil 13 increases. Hereinafter, the cross-sectional shape of the outermost wall 18A will be described with reference to FIG. 7, and the description of the innermost wall 18B having the same cross-sectional shape will be omitted.

Figure 7:
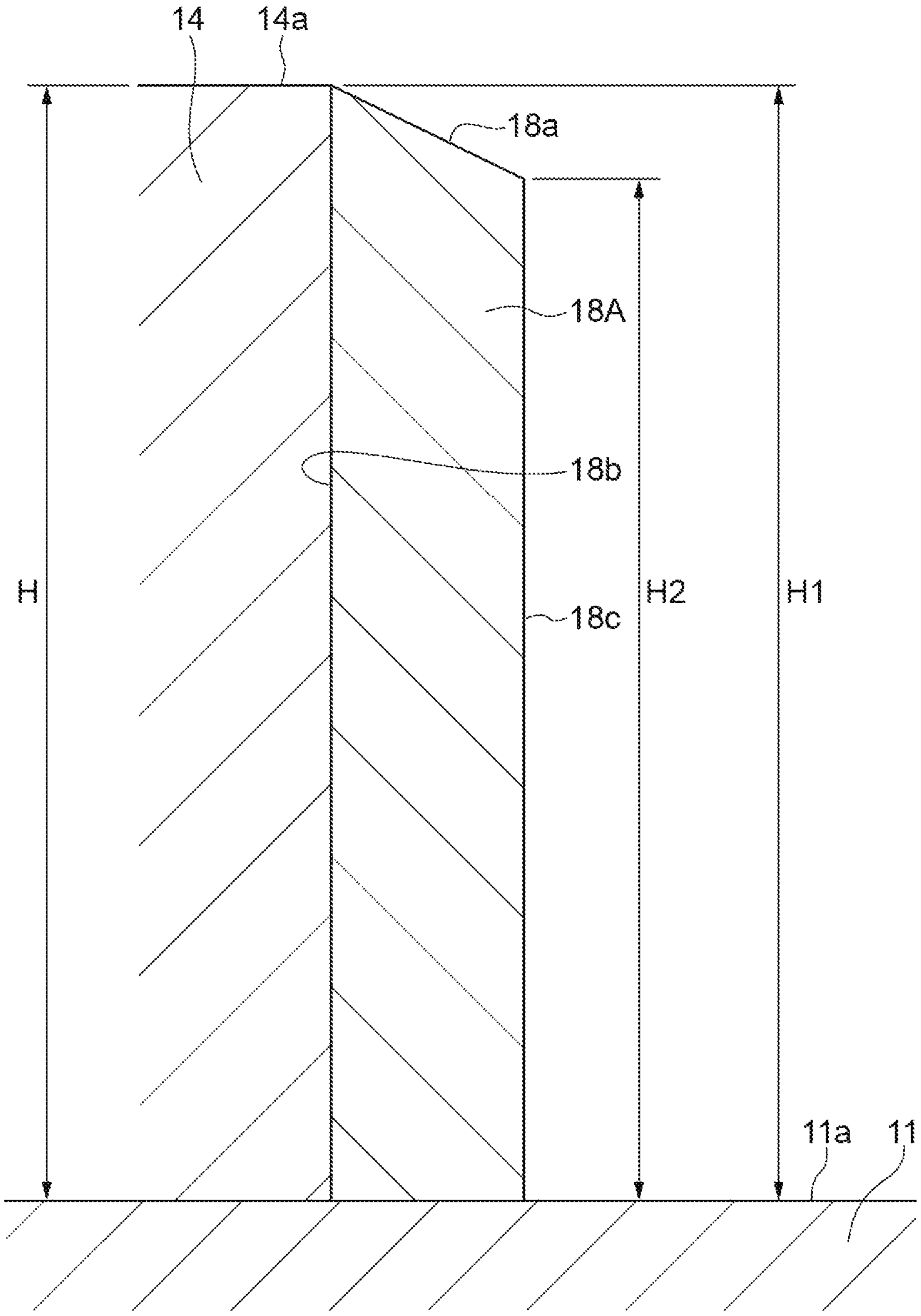
FIG. 7 is an enlarged cross-sectional view showing the outermost wall shown in FIG. 5.

As shown in FIG. 7, the outermost wall 18A has a first side surface 18*b* in contact with the outermost winding part 14 of the coil 13, and a second side surface 18*c* opposite to the first side surface 18*b*. The first side surface 18*b* and the second side surface 18*c* are both orthogonal to the main surface 11*a* of the substrate 11 and parallel to each other. The reference surface height H1 of the first side surface 18*b* is the same as the reference surface height H of the winding part 14 and the inter-wire wall 18C. The reference surface height H2 of the second side surface 18*c* is lower than the reference surface height H1 of the first side surface 18*b*. The upper surface 18*a* of the outermost wall 18A uniformly descends from the position of the first side surface 18*b* to the position of the second side surface 18*c*, and is an inclined surface inclined with respect to the main surface 11*a* of the substrate 11. In the present embodiment, the upper surface 18*a* of the outermost wall 18A is covered with the above-described insulating film 40, but the insulating film 40 is omitted in FIG. 7.

The cross-sectional shape of the outermost wall 18A shown in FIG. 7 can be formed, for example, during polishing performed after the winding part 14 is grown to a height h exceeding the reference surface height H of the inter-wire wall 18C. At the time of polishing, in order to hold the coil 13 and the resin body 17, the resin body 17 can be surrounded by a holding material made of resin.

Figure 8:
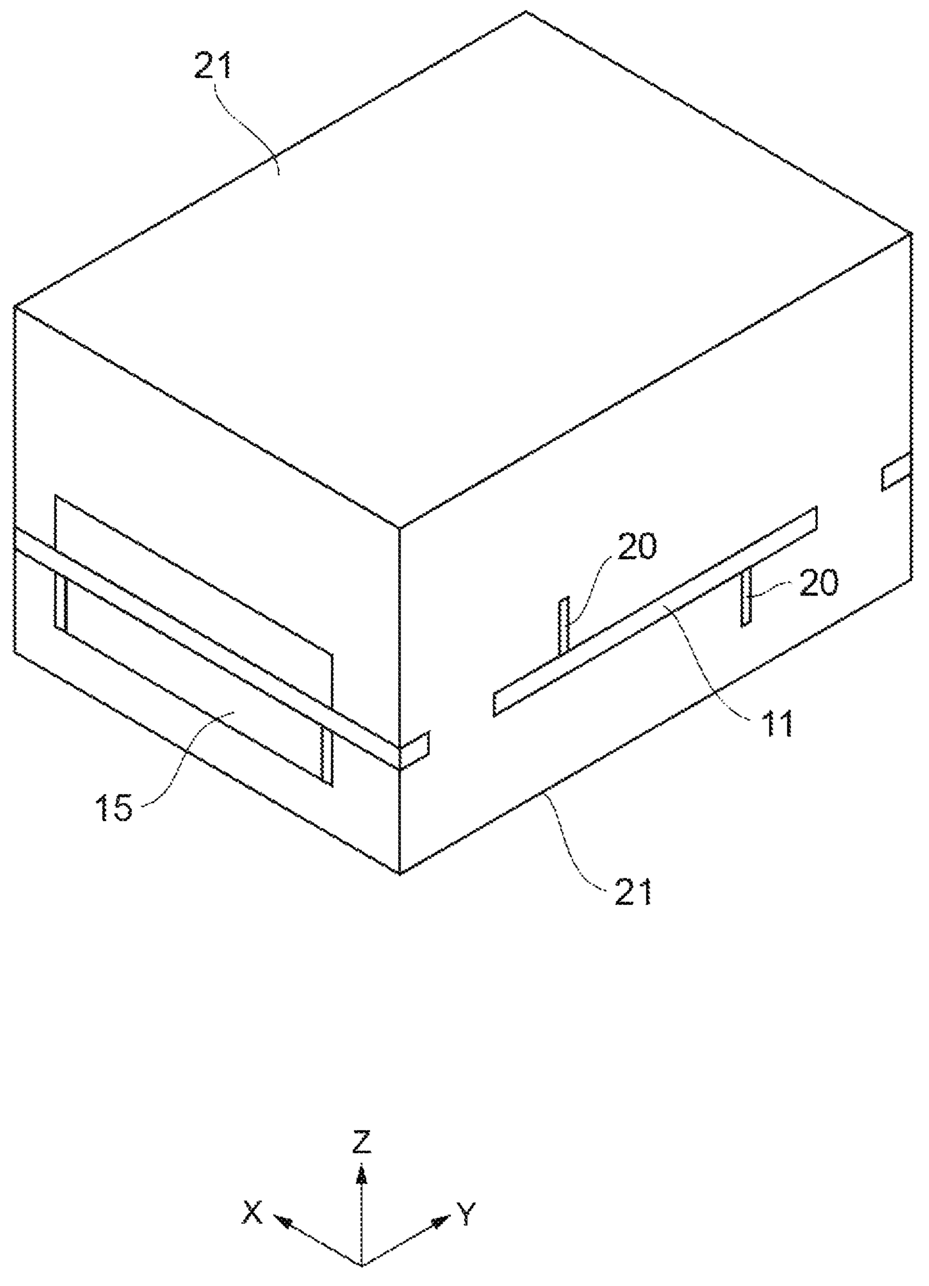
FIG. 8 is a perspective view illustrating one step of the method for manufacturing the coil component shown in FIG. 1.

After the coil 13 is plated and grown on the substrate 11, the substrate 11 is entirely covered with the coating resin 21 as shown in FIG. 8. That is, the coating resin 21 integrally cover the coil 13 on the main surfaces 11*a* and 11*b* of the substrate 11 and the resin body 17. The resin body 17 constitutes a part of the coil component 1 while remaining in the coating resin 21. The coating resin 21 is formed on the substrate 11 in a wafer state and then cured.

The metal magnetic powder-containing resin constituting the coating resin 21 comprises a resin containing a metal magnetic powder dispersed therein. The metal magnetic powder may be made of, for example, an iron-nickel alloy (permalloy), carbonyl iron, an amorphous metal, an amorphous or crystalline FeSiCr-based alloy, or Sendust. The resin used in the metal magnetic powder-containing resin is, for example, a thermosetting epoxy resin. The amount of the metal magnetic powder contained in the metal magnetic powder-containing resin is, for example, 90 to 99 wt %.

Figure 9:
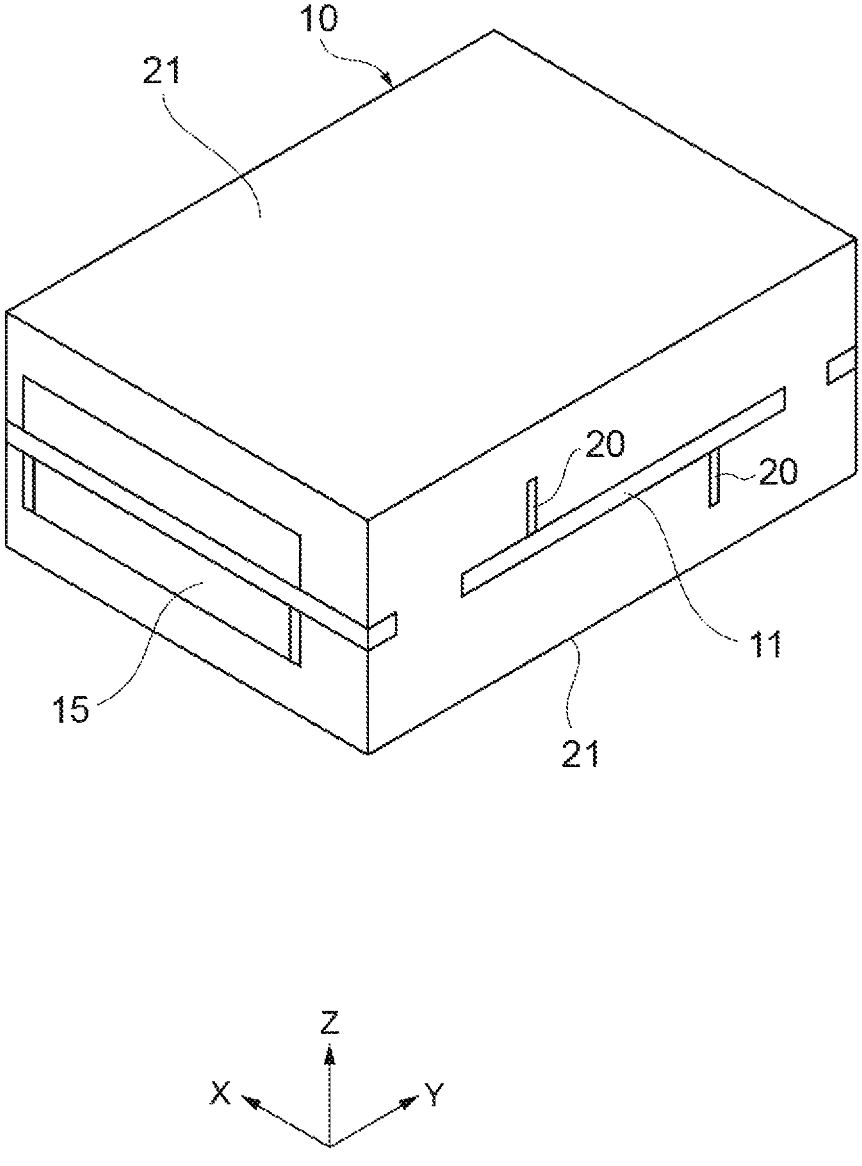
FIG. 9 is a perspective view illustrating one step of the method for manufacturing the coil component shown in FIG. 1.

Further, the wafer is diced into chips to obtain the main body 10 shown in FIG. 9. After chipping, the edge may be chamfered by barrel polishing or the like as necessary.

Finally, external terminal electrodes 30A and 30B are provided at end faces of the main body 10 (end faces opposed to each other in the Y direction), at which the end patterns 15A are exposed, so as to be electrically connected to the end patterns 15A. In this way, the coil component 1 is completed. The external terminal electrodes 30A and 30B are provided to connect the coil component to the circuit of a substrate on which the coil component is to be mounted, and may have a multi-layer structure. For example, the external terminal electrodes 30A and 30B may be formed by applying a resin electrode material onto the end faces and then coating the resin electrode material with metal plating. The metal plating used to form the external terminal electrodes 30A and 30B may be made of, for example, Cr, Cu, Ni, Sn, Au, or solder.

In the above-described coil component 1, the maximum reference surface height H1 of the entire wall of the outermost wall 18A and the innermost wall 18B is the same as the reference surface height H of the winding part 14 of the coil 13, that is, equal to or less than the reference surface height H of the winding part 14 of the coil 13 (H1≤H). In addition, in both the outermost wall 18A and the innermost wall 18B, the reference surface height H2 of the second side surface 18*c* is lower than the reference surface height 11 of the winding part 14 of the coil 13 (H2<H).

In this case, in the vicinity of the upper surface 18*a* of the outermost wall 18A and the innermost wall 18B, the magnetic flux toward the main surface 11*a* side is suppressed from being blocked by the outermost wall 18A and the innermost wall 18B, and the magnetic flux circulation is improved. Thus, the coil characteristics of the coil component 1 are improved.

Even when the maximum reference surface height of the entire wall is equal to or less than the reference surface height H of the winding part 14 of the coil 13 and the reference surface height H2 of the second side surface 18*c* is lower than the reference surface height H of the winding part 14 of the coil 13 in one of the outermost wall 18A and the innermost wall 18B, the magnetic flux circulation in the vicinity of the upper surface 18*a* of the outermost wall 18A or the innermost wall 18B is improved, thereby improving the coil characteristics of the coil component 1.

Figure 10:
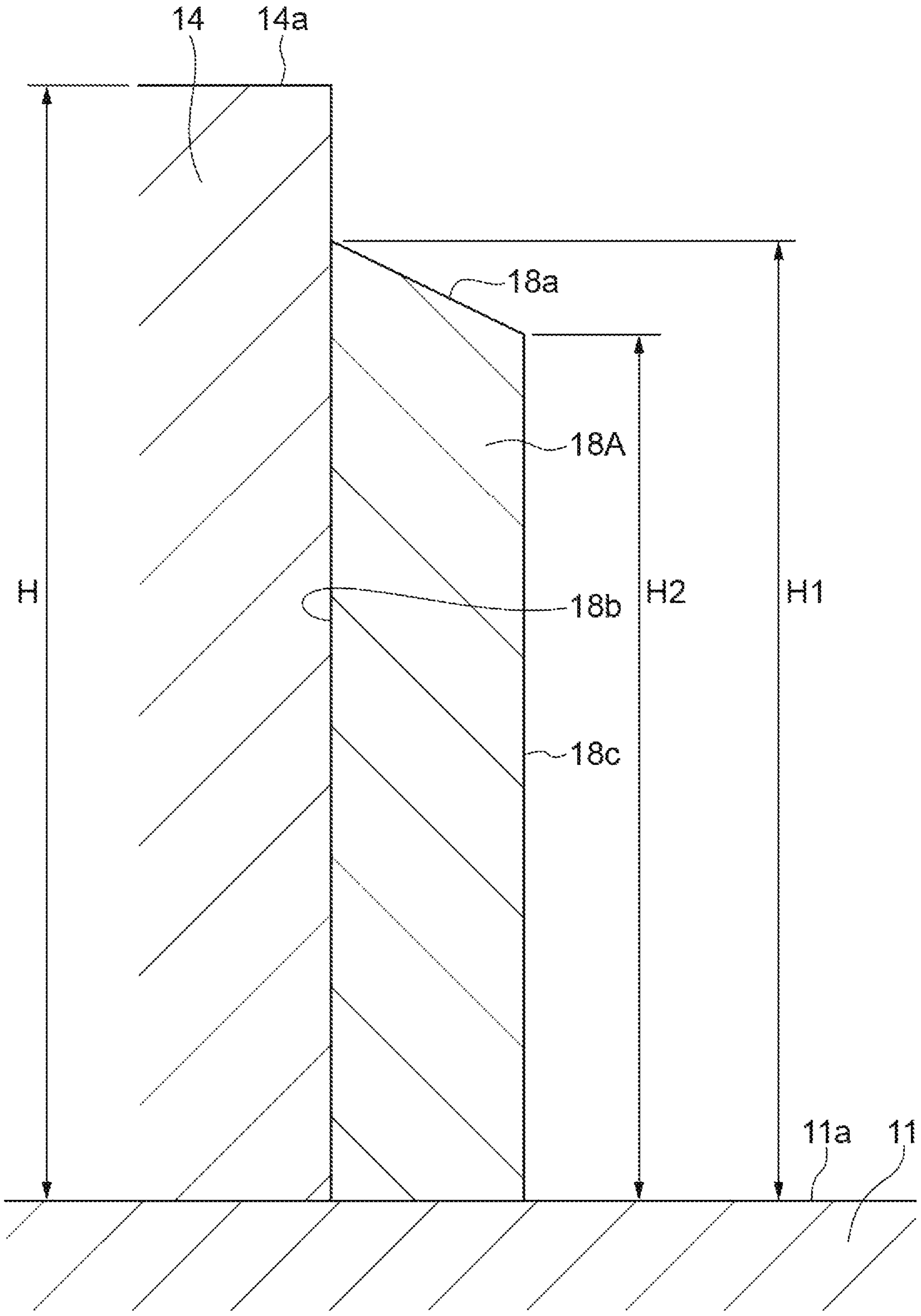
FIG. 10 is a cross-sectional view showing the outermost wall of a different embodiment.
Figure 11:
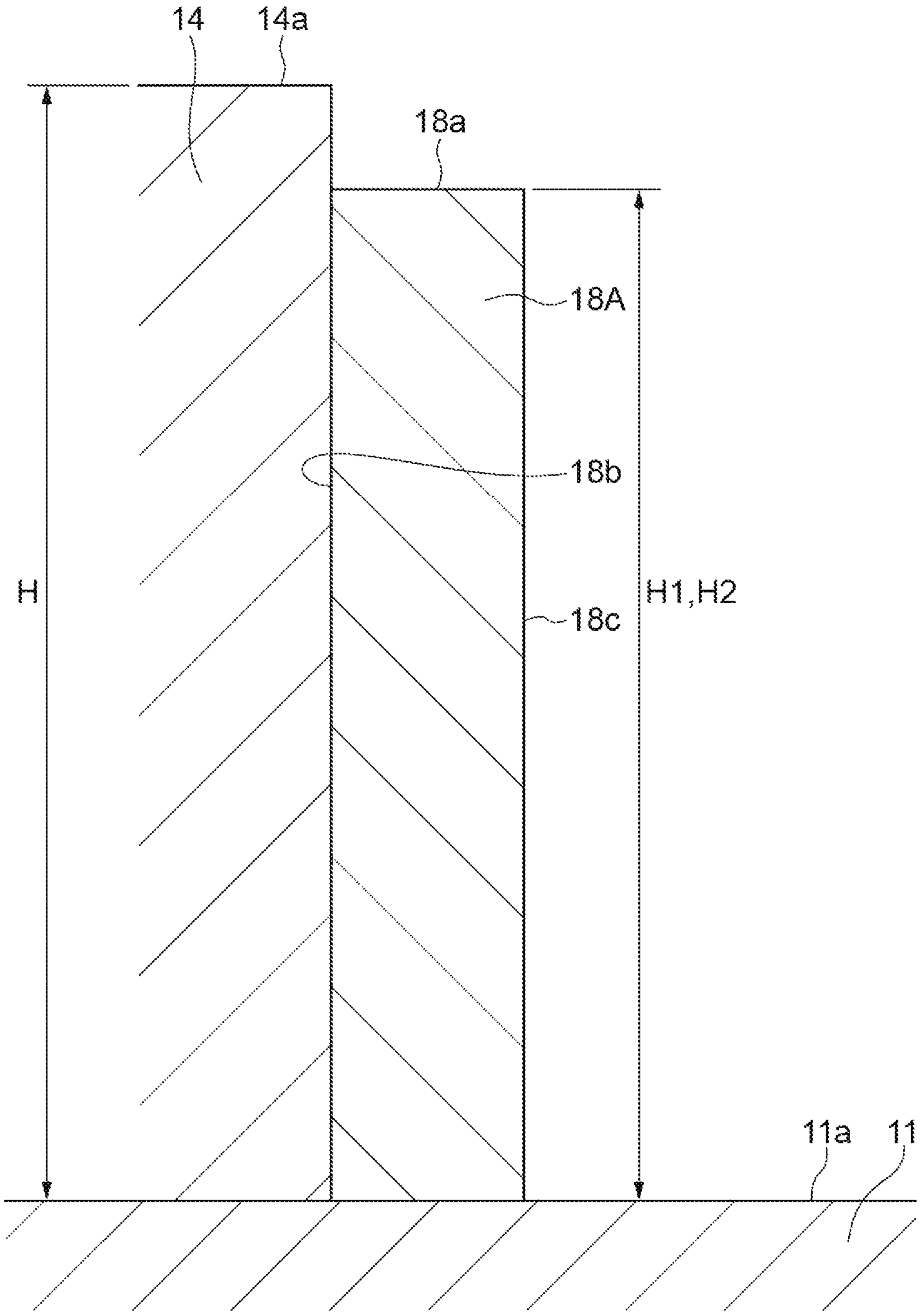
FIG. 11 is a cross-sectional view showing the of outermost wall of a different embodiment.
Figure 12:
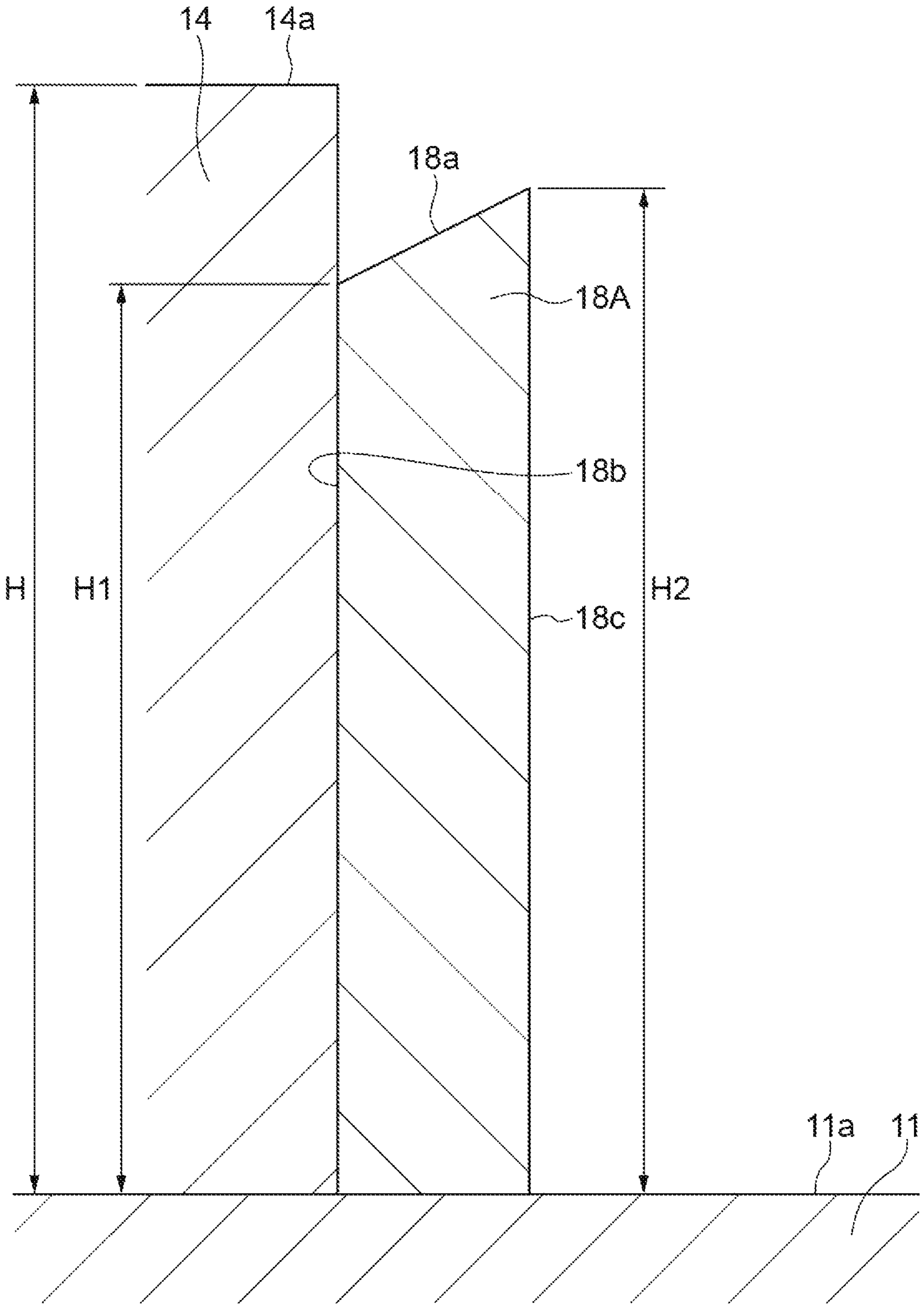
FIG. 12 is a cross-sectional view showing the outermost wall of a different embodiment.

The outermost wall 18A and the innermost wall 18B described above are not limited to the cross-sectional shapes shown in FIG. 7, and may have, for example, cross-sectional shapes as shown in FIGS. 10 to 12. In any cross-sectional shape, the magnetic flux circulation in the vicinity of the upper surface 18*a* of the outermost wall 18A or the innermost wall 18B is improved, and as a result, the coil characteristics of the coil component 1 are improved.

The cross-sectional shape of the outermost wall 18A shown in FIG. 10 is lower than the cross-sectional shape of the outermost wall 18A shown in FIG. 7. Therefore, not only the reference surface height H2 of the second side surface 18*c* but also the reference surface height H1 of the first side surface 18*b* are lower than the reference surface height H of the winding part 14 of the coil 13. Similarly to the cross-sectional shape shown in FIG. 7, also in the cross-sectional shape of FIG. 10, the reference surface height H2 of the second side surface 18*c* is lower than the reference surface height H1 of the first side surface 18*b*.

In the cross-sectional shape of the outermost wall 18A shown in FIG. 11, the reference surface height H1 of the first side surface 18*b* is the same as the reference surface height H2 of the second side surface 18*c*. The upper surface 18*a* of the outermost wall 18A is parallel to the main surface 11*a* of the substrate 11.

In the cross-sectional shape of the outermost wall 18A shown in FIG. 12, similarly to the cross-sectional shape shown in FIG. 10, not only the reference surface height H2 of the second side surface 18*c* but also the reference surface height H1 of the first side surface 18*b* are lower than the reference surface height H of the winding part 14 of the coil 13. In the cross-sectional shape shown in FIG. 12, the reference surface height H1 of the first side surface 18*b* is lower than the reference surface height H2 of the second side surface 18*c*.

As shown in FIG. 6, after the winding part 14 of the coil 13 is once grown to the height h exceeding the reference surface height H of the resin wall 18, the upper surface 14*c* of the winding part 14 is polished to make the upper surface 14*c* of the winding part 14 flush with the upper surface 18*a* of the resin wall 18, whereby the upper surface 14*c* of the winding part 14 of the coil 13 can be easily made flush with the upper surface 18*a* of the resin wall 18.

In addition, as shown in FIG. 5, since the portion of the insulating film 40 covering the winding part 14 of the coil 13 has a uniform thickness, there is no portion where the insulating film 40 is locally thin, that is, there is no portion where the insulating property is locally lowered, and the insulating film 40 has a high insulating property.

According to the method of manufacturing the coil component 1, the winding part 14 of the coil 13 is interposed between the resin walls 18 in a non-bonding state, and therefore the winding part 14 of the coil 13 and the resin walls 18 can be displaced with respect to each other. Therefore, even when generated due to a change in ambient temperature such as an increase in the temperature of an environment in which the coil component 1 is used, stress resulting from the difference in the coefficient of thermal expansion between the winding part 14 of the coil 13 and the resin walls 18 is relaxed by relative displacement between the winding part 14 of the coil 13 and the resin walls 18.

According to the method of manufacturing the coil component 1, the winding part 14 of the coil 13 is grown by plating so as to be interposed between the resin walls 18 of the resin body 17. That is, the resin wall 18 is already interposed between adjacent turns of the winding part 14 of the coil 13 before the coil 13 is covered with the coating resin 21. Therefore, it is not necessary to separately fill the space between adjacent turns of the winding part 14 of the coil 13 with resin. Further, the resin walls 18 stabilize the dimensional accuracy of resin between adjacent turns of the winding part 14 of the coil 13.

What is claimed is:

1. A coil component comprising:

a substrate;

a coil provided on a main surface of the substrate by plating and having a winding part having a uniform reference surface height with the main surface of the substrate as a reference surface;

a resin body provided on a main surface of the substrate and having a plurality of resin walls, the winding part of the coil extends between the plurality of resin walls;

a resin film integrally covering an upper surface of the coil and an upper surface of the resin body; and a coating resin made of magnetic powder-containing resin, the coating resin integrally covers the coil, the resin body, and the resin film provided on the main surface of the substrate;

wherein the plurality of resin walls arranged on the main surface of the substrate include an outermost wall located at an outermost position, an innermost wall located at an innermost position, and an inter-wire wall interposed between the winding part of the coil;

wherein, in at least one of the outermost wall and the innermost wall, the maximum reference surface height of the entire wall is equal to or less than the reference surface height of the winding part of the coil, and the reference surface height of a second side surface opposite to a first side surface in contact with the winding part of the coil is lower than the reference surface height of the winding part of the coil.

2. The coil component according to claim 1, wherein, in at least one of the outermost wall and the innermost wall, the reference surface height of the second side surface is lower than the reference surface height of the first side surface.

3. The coil component according to claim 2, wherein an upper surface of at least one of the outermost wall and the innermost wall in which the reference surface height of the second side surface is lower than the reference surface height of the first side surface is inclined with respect to the main surface of the substrate.

4. The coil component according to claim 1, wherein, in at least one of the outermost wall and the innermost wall, the reference surface height of the second side surface is the same as the reference surface height of the first side surface.

5. The coil component according to claim 1, wherein the reference surface height of the inter-wire wall is the same as the reference surface height of the winding part of the coil, and the upper surface of the inter-wire wall and the upper surface of the winding part of the coil form a flat surface.

6. The coil component according to claim 1, wherein the resin film has a uniform thickness on the winding part of the coil and on the inter-wire wall, and the uniform thickness is thinner than the thickness of the inter-wire wall.

7. The coil component according to claim 1, wherein the thickness of the outermost wall is greater than the thickness of the inter-wire wall.

8. The coil component according to claim 7, wherein the thickness of the outermost wall is 3 to 6 times the thickness of the inter-wire wall.

* * * * *